United States Patent [19]
Chen et al.

[11] Patent Number: 5,180,905
[45] Date of Patent: Jan. 19, 1993

[54] CARD READER APPARATUS WITH REPLACEABLE CARD GUIDE

[75] Inventors: Harold Chen, Taipei, Taiwan; Noah L. Anglin, San Jose; Stanley J. Hludzinski, Auburn, both of Calif.

[73] Assignee: VeriFone Inc., Redwood City, Calif.

[21] Appl. No.: 816,130

[22] Filed: Dec. 30, 1991

Related U.S. Application Data

[63] Continuation-in-part of Ser. No. 617,344, Nov. 23, 1990, Pat. No. 5,164,576.

[51] Int. Cl.5 .......................................... G06K 13/06
[52] U.S. Cl. .................................. 235/483; 235/449; 235/485
[58] Field of Search ............... 235/449, 483, 485, 486; 360/2

[56] References Cited

U.S. PATENT DOCUMENTS

| | | | |
|---|---|---|---|
| 4,527,052 | 7/1985 | Kilborn | 235/475 |
| 4,605,843 | 8/1986 | Aubrey | 235/486 |
| 5,089,694 | 2/1992 | Zerfahs | 235/486 |

*Primary Examiner*—Harold Pitts
*Attorney, Agent, or Firm*—Lowell C. Bergstedt

[57] ABSTRACT

A point of sale terminal having a reader assembly for reading a data carrier having data stored on at least one data track thereon. The terminal includes a housing defining a guide slot location for the data carrier and a transducer for detecting data stored on the data track. A removable guide element is mounted to the housing at the data carrier slot location. This guide element has a read head bracket which is snap mounted thereto. A registration arrangement permits mounting of the read head bracket in two registered positions for determining which of multiple data tracks will be read by the transducer.

18 Claims, 4 Drawing Sheets

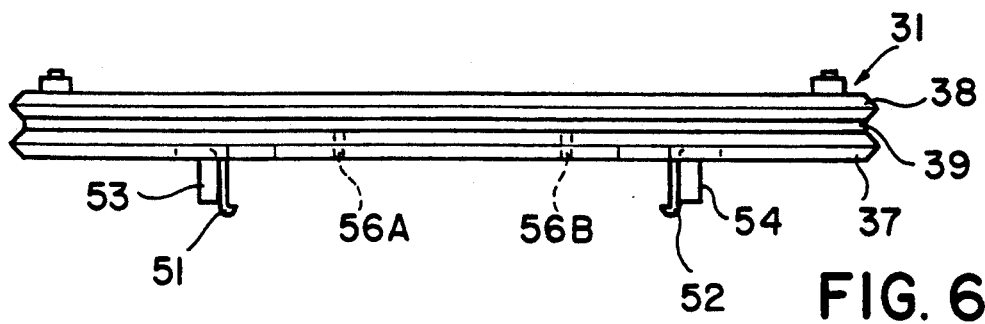
FIG. 6
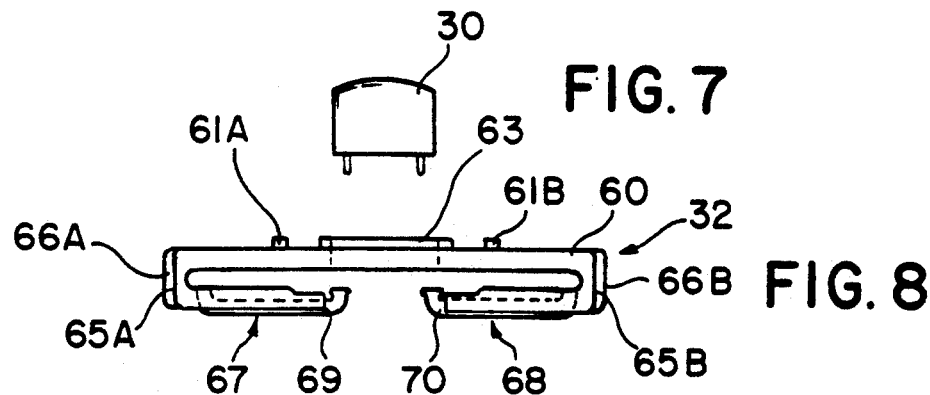
FIG. 7
FIG. 8
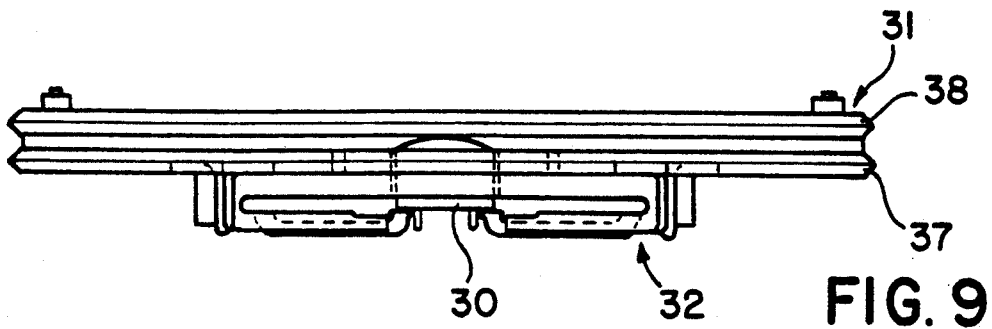
FIG. 9

CARD READER APPARATUS WITH REPLACEABLE CARD GUIDE

CROSS REFERENCE TO RELATED APPLICATIONS

This application is a continuation in part of copending and commonly assigned U.S. patent application Ser. No. 07/617,344, filed Nov. 23, 1990, now U.S. Pat. No. 5,164,576.

FIELD OF THE INVENTION

This invention relates generally to apparatus for reading data tracks on data carriers. More specifically, this invention relates to a data carrier reader subassembly with a replaceable and interchangeable card guide element for use in apparatus, such as a point of sale terminal.

BACKGROUND AND PRIOR ART

Chang et al. U.S. Pat. No. 4,788,420, entitled "System and Method for Reading Data Record Stripes on Data Cards," discloses one form of prior art point of sale terminal which incorporates a card reader assembly. The Chang et al. terminal utilizes a card guide which is integrally molded into the terminal case. A metal wear strip is molded into the bottom of the card guide slot to provide a surface which has better wear characteristics than the plastic material from which the terminal housing is formed in an injection molding process. In other prior art terminals, a separate metal wear strip is fastened to the terminal housing to form the bottom wall of a card guide slot to provide longer wear characteristics.

Kobayashi et al. U.S. Pat. No. 4,304,992, entitled "Magnetic Card Reader" discloses (FIGS. 4-6) a card reader in the form of a separate module with a housing that defines the card slot and encloses both the read head and decoder electronics for processing signals from the read head as a card is wiped through the slot. The card reader module is designed to be mounted to a point of sale terminal to provide a card reading function.

It is also known in the prior art to provide complete card reader subassemblies (i.e. with read head and decoder electronics together in a separate housing) that are designed to be physically integrated into the case of a point of sale terminal. For example, Tokin Corporation sells a card reader subassembly in which a read head frame snaps onto a card guide element. The read head frame carries a magstripe read head which is mounted in a separate bracket through which a thin pin-type spring extends. This spring can be carried in one or two possible pin mounting groove arrangements on the read head frame to position the read head at two different locations for alignment with different tracks on the magstripe card. While this card reader assembly has a fairly simple and low cost design, the use of a separate bracket and spring to carry the read head adds both parts and assembly labor cost to the overall unit.

OBJECTS OF THE INVENTION

It is the principal object of this invention to provide an improved reader assembly for a data carrier such as a data card.

It is another object of this invention to provide a data carrier reader subassembly that can be utilized interchangeably in various types of systems.

It is another object of this invention to provide a reader subassembly in the form of a removable, replaceable data carrier guide element.

It is another object of this invention to provide a card reader assembly for an injection molded housing which incorporates a separate card guide formed from a material with higher wear resistance.

It is another object of this invention to provide a card reader assembly for a terminal in which the card guide and read head assembly are removably mounted to a terminal case.

It is another object of this invention to provide a card reader with a removable card guide assembly having an improved, simplified and low cost read head mounting arrangement.

It is another object of this invention to provide an improved point of sale terminal with a replaceable card guide assembly.

It is another object of this invention to provide a card reader assembly that is readily configured for selectably reading one of several different data tracks or one pair out of two different pairs of data tracks on a data card.

FEATURES AND ADVANTAGES OF THE INVENTION

This invention features a data carrier reading subassembly for reading data stored on a data carrier which has at least one data track thereon. The reading assembly is adapted for use with a housing which defines a data carrier slot location and incorporates a transducer for detecting the data stored on the data track. A guide is removably mounted to the housing means at the data carrier slot location. The guide has at least a bottom wall portion defining a bottom guide surface of a guide slot for the data carrier or data card and one major side wall portion defining one side guide surface of a guide slot for the data carrier and also defining an access window. A mounting frame arrangement mounts the transducer at a prearranged location within the access window for accurate detection of data stored on the data track of a data carrier being manually swiped through the guide slot. The guide means and the frame arrangement include a cooperative registration means, including at least one pair of position registration elements formed on the first side wall member and a cooperatively engaging pair of position registration elements formed on the frame means for establishing an accurately registered mounting relationship therebetween. This accurately registered mounting relationship defines an accurate position location for the transducer means relative to the access window such that the data pickup element is accurately aligned with the data track. At pair of resilient hook arms are carried on the first side wall member and these hook arms cooperate with a pair of hook engaging surfaces on the frame arrangement to mount it to the guide means.

The removably mounted guide element for the data carrier or data card provides the advantage that this component becomes a replaceable part if it malfunctions or is damaged. It also provides a data card guide which can be used interchangeably on a variety of terminals and card reader products. With such interchangeability between multiple products, costs associated with designing individual modules for each product are avoided. Furthermore, the parts of the card reader subassembly of this invention can be purchased in larger quantities at reduced individual part prices. The hook arm mounting arrangement together with the position registration arrangement provide a simple and low cost mounting arrangement requiring no complicated assembly operations.

Preferably the terminal housing is an injection molded housing formed from a plastic material that is inexpensive and easy to injection mold and meets testing laboratory standards for equipment of this type, but does not have sufficient wear resistance characteristics to serve as the acting wall surface of a card slot. The guide element is preferably formed from a plastic material that has a substantially greater wear resistance characteristic and thus functions well as the material forming the acting card guide surfaces.

In a preferred embodiment of this invention, the housing includes at least one partial side wall portion at the guide slot location and this side wall portion defines a rectangular aperture having an open bottom. The card guide has at least one major side wall portion which defines a mounting wall portion substantially matching the rectangular aperture in the housing. The edge sections of the rectangular aperture edge regions of the mounting wall portion of the card guide define one portion of a cooperative tongue and groove arrangement such that the mounting wall portion of the card guide may be slidably inserted into the rectangular aperture with the cooperative tongue and groove removably mounting the guide means to the housing. In this embodiment, the data track on the data carrier is positioned at a prearranged data track location corresponding to a one of at least first and second predefined data track locations on the data carrier.

The cooperative registration means comprises first and second pairs of position registration elements formed on the first side wall member of the guide means such that the cooperatively engaging pair of position registration elements formed on the frame means may be selectably engaged with a prearranged one of the first and second pairs of position registration elements to position the frame means relative to the guide means in a prearranged one of first and second registered positions. With this registration the data pickup element of the transducer means is aligned with one of the first and second predefined data track locations. The hook engaging surfaces on the frame means are formed to permit engagement with the pair of resilient hook arms in both the first and second registered positions.

This mounting arrangement provides a secure and well registered mounting location for the card guide element at the defined card guide location. The replaceable card guide element serves as the acting card slot in the card reading region of the terminal which is the major wear point. The registration arrangement on the frame and guide together with the snap hook type mounting arrangement provide a low cost assembly. The read head is accurately registered with the data tracks in one of two selectable positions.

In a preferred embodiment, a track alignment indicating feature is provided. This feature includes a first alignment means formed on the first side wall member of the guide means and a second alignment means formed on the frame means. The first and second alignment means cooperatively assist in aligning the guide means and the frame means for mounting the frame means in one of the first and second registered positions. Preferably, the first alignment means comprises first and second pairs of guide slots formed on the first side wall member of the guide means, and the second alignment means comprises a pair of alignment tabs formed on the frame means and adapted to be received into the guide slots. With this feature, the frame arrangement holding the read head is readily placed in the selected one of two possible positions.

In a specific embodiment of this invention directed to reading magnetic stripe data cards, the data carrier has a magnetic data track thereon and the data pickup element on the transducer means is a magnetic pick up head adapted to contact the magnetic data track for reading data on the track. The access window is an aperture formed in the first one of the side wall members to admit the magnetic pick up head into the guide slot. The frame means is formed from a plastic material and has integrally formed spring means carried thereon for engaging the transducer means and biasing the transducer means toward the guide slot to maintain contact pressure between the magnetic pick up head and the magnetic data track as the data carrier is passed through the guide slot. By using an integrally formed spring means, the part count of the unit is reduced and the assembly operation is simplified, both factors contributing to lower cost for the assembled unit.

Other objects, features and advantages of this invention will be apparent from a consideration of the detailed description of various embodiments set forth below in conjunction with the accompanying drawings.

BRIEF DESCRIPTION OF THE DRAWINGS

FIG. 6 is a top view of a card guide element in accordance with this invention.

FIG. 7 is a top view of a magnetic read head useful with one embodiment of this invention.

FIG. 8 is a top view of a mounting frame with integral spring in accordance with this invention.

FIG. 9 is a top view of an assembled card reader apparatus in accordance with this invention.

DETAILED DESCRIPTION OF INVENTION EMBODIMENTS

Figure 2:
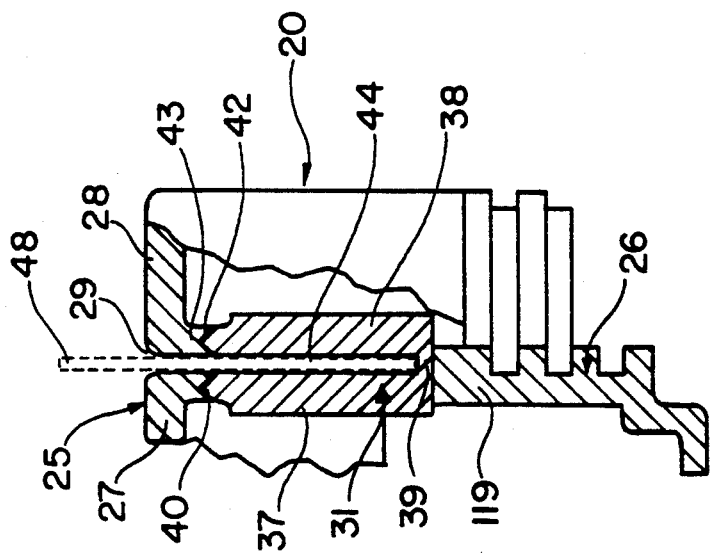
FIG. 2 is a partial section view of card reader apparatus in accordance with this invention and taken along the lines 2—2 in FIG. 1.
Figure 1:
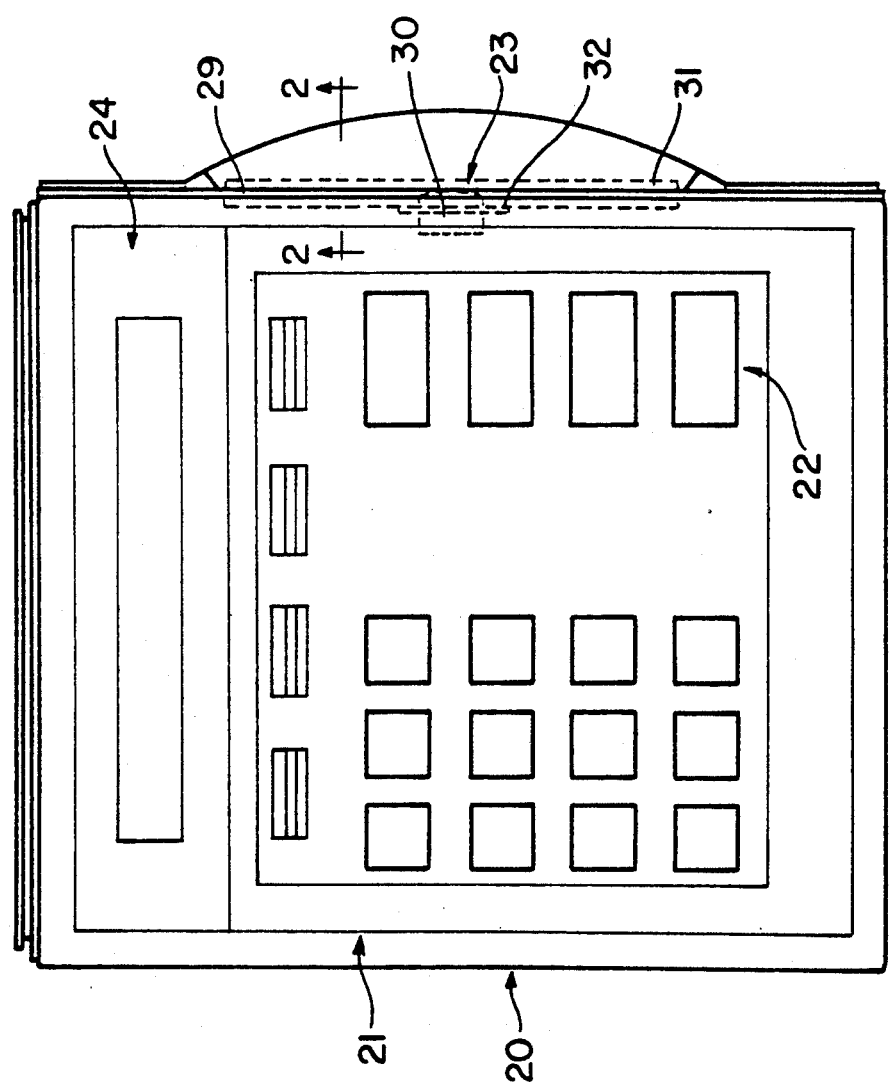
FIG. 1 is a top plan view of a point of sale terminal incorporating card reader apparatus in accordance with this invention.

Referring now to FIGS. 1—5, the elements of this invention are shown as comprising an apparatus 20 having a reader subassembly 23 for reading a data carrier 48 (FIG. 2). Apparatus 20 in this embodiment is in the form of a point of sale transaction automation terminal. Data carrier 48 as shown here is a plastic card, e.g. a credit card or a debit card or other form of data card, which carries a magnetic stripe having one or more data tracks thereon. It should be understood that this invention is adaptable to use with various forms of data carriers in addition to data cards with magnetic stripes thereon, such as, for example, a data carrier with a bar code thereon or a data carrier, such as a check, with MICR bank account and identification data thereon. In each case the transducer employed to read the data will be suited to the data being scanned.

Apparatus 20 includes a housing 21 which defines a guide slot location 29 for data carrier 48. A transducer in the form of magnetic read head 30 is provided for reading data stored on a data stripe on data carrier 48. A data carrier guide in the form of card guide 23 is removably mounted to housing 21 at data carrier slot location 29. Card guide 23 has a bottom wall portion 39 and a major side wall portion 37 and defines an access window (55 in FIG. 10). A mounting arrangement 32 is provided for mounting read head 30 at a prearranged location within access window 50 for accurate detection of data on the data stripe of data carrier 48 when it is manually swiped through guide slot 29. Read head 30 may be mounted in the left hand side of the card slot (as shown) or alternatively on the right hand side and this determines the orientation of the data card during a card swipe operation.

Housing 21 is preferably formed as an injection molded housing using a material, such as 900 series "Lexan" brand of polycarbonate material. Other plastic materials capable of being injection molded, but meeting laboratory standards for terminal housing could also be used. These materials typically have wear characteristics which make them unsuitable to form the acting surfaces of a card guide, i.e. the surfaces would not withstand the large number of card swipes at which terminals of this type are typically specified.

Card guide 31 may be formed by machining, injection molding, or a combination of extruding and machining depending on the materials used. However, injection molding of of a strong material with good wear characteristics is preferred so that the card slot is capable of withstanding a minimum of several million swipes of a card therethrough without showing substantial surface wear to the point of degrading card reading performance. Preferably, the material is Nylon 6/6 with 30% short fiberglass and ten percent by weight of carbon particles dispersed therein to lower the resistivity of the material for static charge control. While this produces a gray or black colored material, card guide element 31 is typically hidden within the housing of the terminal or other device and thus color matching is not required.

The card guide element should be formed with smooth surfaces in the card guide slot region 44 so as to minimize wear on the data card passing therethrough.

Figure 3:
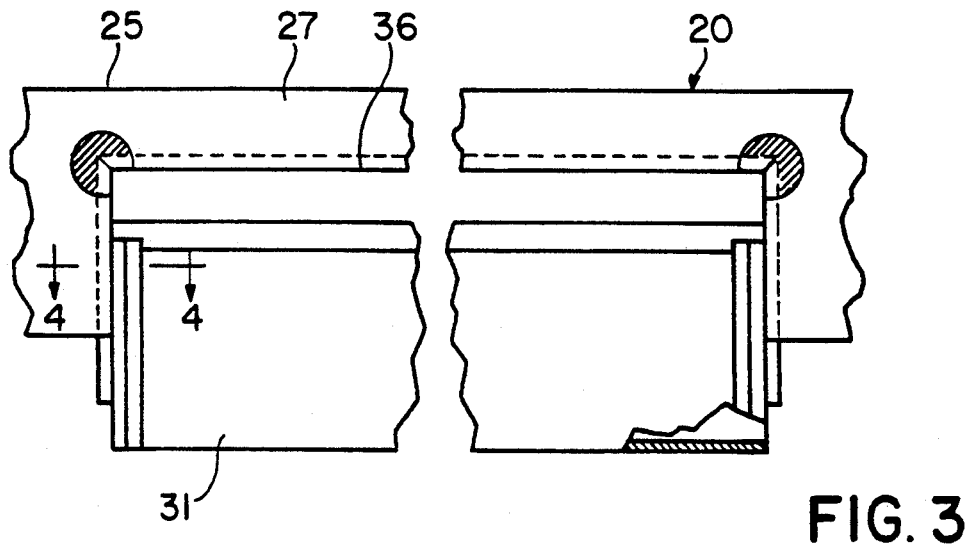
FIG. 3 is a partial assembly view showing the structure and mounting of a card guide element of card reader apparatus in accordance with this invention.
Figure 4:
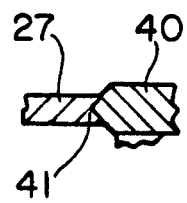
FIG. 4 is a partial section view taken along the lines 4—4 in FIG. 3.

Point of sale terminal 20, which incorporates features of this invention, includes a housing assembly 21, a keyboard assembly 22, a card reader assembly 23, and a display assembly 24. Housing assembly 21 comprises a top enclosure section 25 and a bottom enclosure section 26 which snap together to form a complete enclosure for electronic circuit subassemblies (not shown) that are mounted therewithin. Removable card guide 31 is mounted in a rectangular opening 36 formed in side wall portion 27 of top enclosure section 25. As shown in FIGS. 3 and 4, each of the edge sections 41 that define rectangular opening 36 have a groove formed therein that cooperates with a tongue formed on edge portions 40 of side wall 37 of card guide 31. Thus side wall 37 as adapted to be removably mounted in opening 36 by sliding it in from the bottom of the opening.

As shown in FIG. 2, side wall portion 28 of bottom enclosure section 26 and side wall portion 27 of top enclosure section 25 define card guide location 29. The active card guide slot 44 at the card reading location associated with read head 30 is, however, defined by side wall sections 37 and 38 and bottom wall section 39 of card guide 31. The upper edge of side wall section 38 has an outwardly extending tongue 42 formed thereon and this tongue cooperates with an associated groove 43 formed in side wall portion 28 to provide a stable, registered mounting relationship therebetween. Read head 30 is mounted to side wall 37 using a mounting frame 32 which is more fully described below.

Figure 5:
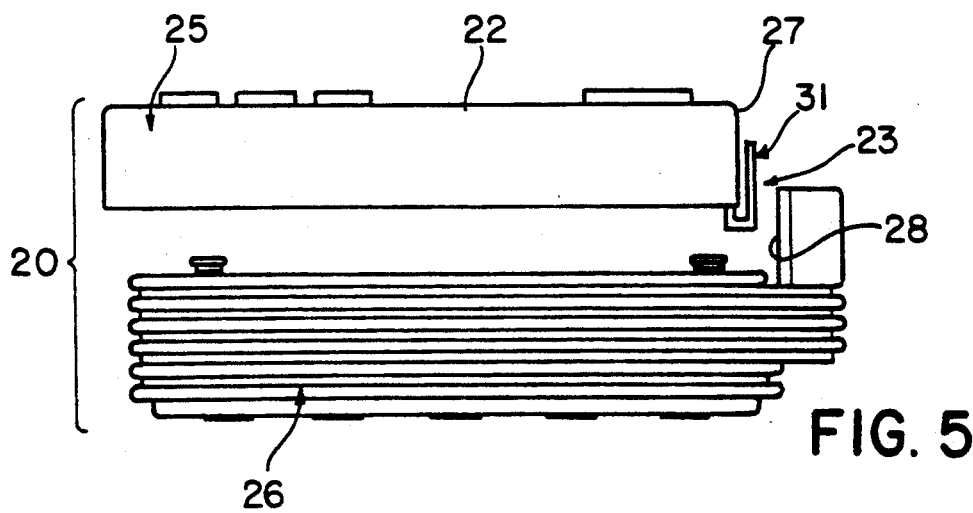
FIG. 5 is an exploded view of the terminal housing arrangement and card guide arrangement in accordance with one embodiment of this invention.

As shown in FIG. 5, card guide 31 is first mounted to top housing member 25. To assemble housing 21, the tongue portion 42 is slipped into the groove portion 43 and then top housing member 25 is rotated and snapped together with bottom housing member 26. Bottom wall section 39 of card guide 31 rests on a platform 49 formed on bottom enclosure member 26 to provide full confinement of card guide 31 within housing 21. This tongue and groove mounting arrangement ensures that side walls 37 and 38 of card guide element 31 guide element will be maintained in precisely registered positions and form an accurately dimensioned card guide slot 44. The material of guide slot 31 provides long wear and the removable mounting arrangement provides the opportunity to repair or replace this subassembly if it becomes defective through wear or other causes.

Figure 10:
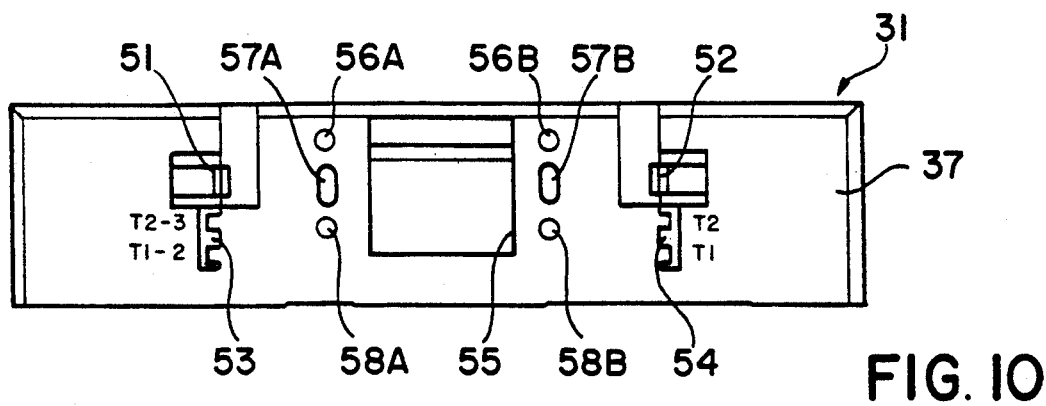
FIG. 10 is a front view of a card guide element in accordance with this invention.
Figure 11:
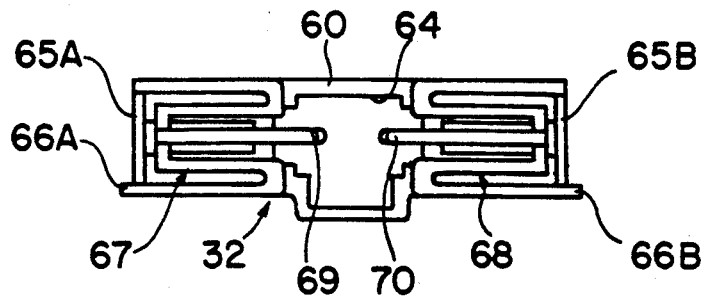
FIGS. 11 and 12 are, respectively, a front view and back view of a mounting frame in accordance with this invention.
Figure 12:
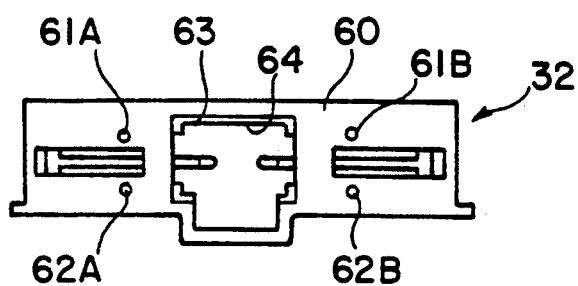

Referring now to FIGS. 6–13, details of structure and operation of a card reader assembly in accordance with this invention will be discussed. FIGS. 2, 6 and 10 illustrate the structure of card guide element 31. Opposing side wall members 37 and 38 together with bottom wall member 39 form a card slot through which a data card may be guided in a manual card swiping operation. Side wall 37 has integrally formed therein a pair of resilient hook arms 51, 52 to provide part of a snap together mounting arrangement to hold mounting frame 32 on card guide element 31 as shown particularly in FIG. 9. Bracket elements 65A,65B on mounting frame 32 cooperate with resilient hook arms 51,52 to latch these two parts securely together. A read head access window 55 is also formed in side wall 37 to receive the front portion of read head 30. The size of window 55 is designed to accommodate the positioning of read head 30 in a plurality of possible positions relative to the bottom wall of the card guide slot. Read head 30 is carried on mounting frame 32 in a central frame member 63.

Mounting frame 32 is preferably formed from a plastic injection molding material such as "Delrin 500" from Dupont. Read head 30 may be selected from a number of conventional read head technologies depending on the nature of the data track being read. In the case of a magnetic data track on a magnetic stripe on the data carrier, a conventional magnetic read head or single or dual pick up structure may be employed.

A cooperative registration arrangement is provided on card guide element 31 and mounting frame 32 to enable mounting frame 32 to be snap mounted in a selectable one of two registered mounting position on side wall 37. These registered mounting positions are referenced to the location of central frame member 63 on mounting frame 32 so that the read head 30 carried in the central frame member will be accurately registered in read head window 55 and data pickup elements will be positioned to read the desired data tracks.

In a preferred form of a cooperative registration arrangement, two pairs of registration pin elements 61A,61B and 62A,62B are formed on a back surface of wall 60 of mounting frame 32 at accurately located positions. In a front surface of side wall 37 are formed an arrangement of registration apertures and slots, comprising in this embodiment two pairs of apertures 56A,56B and 58A,58B together with a pair of registration slots 57A,57B. These pairs of apertures and pair of slots are formed at accurately located positions relative to the bottom wall member of the card guide element. The positions of these registration apertures and slots in side wall 37 determine the positions of the two pairs of registration pin elements on mounting frame 32.

It should be apparent that other forms of cooperative registration arrangements could be utilized. In some embodiments, it may be possible to switch the registration pin elements and registration apertures and slots between the two parts. A single pair of registration pin elements may be sufficient in some instances.

Figure 13:
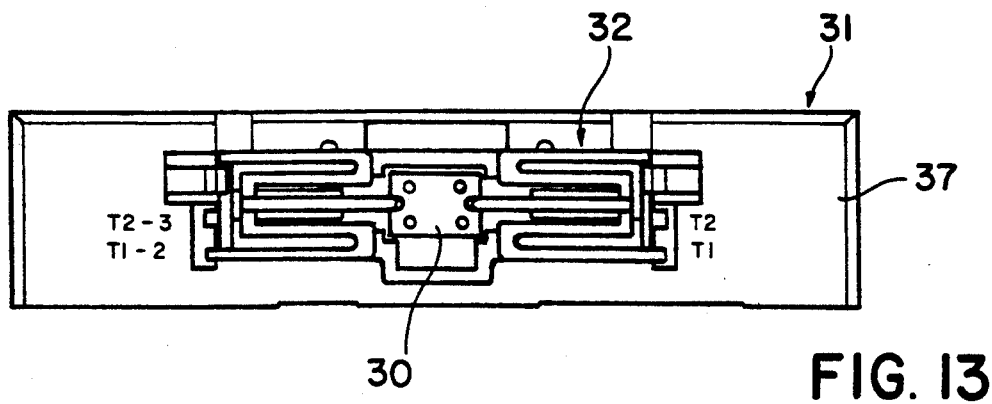
FIG. 13 is a front view of an assembled card reader apparatus in accordance with this invention.

A cooperative alignment guide arrangement is provided on card guide element 31 and mounting frame 32. Alignment guides 53 and 54 are carried on side wall 37 of card guide element 31. Associated alignment guide tabs 66A,66B are carried on mounting frame 32. As shown in FIG. 13, alignment guides 53,54 may comprise an arrangement of two slots each associated with one of two selectable mounting positions for mounting frame 32.

The two alignment slots on alignment guide 53 are labeled T1-2 and T2-3 to indicate mounting positions associated, respectively, with a first pair of tracks, i.e. Tracks 1 and 2 and a second pair of tracks, i.e. Tracks 2 and 3. This dual track alignment arrangement pertains to a mounting frame carrying a magnetic read head with dual track pick up elements on a front face thereof.

The two alignment slots on alignment guide 54 are labeled T1 and T2, respectively, and are useful in connection with aligning a mounting frame carrying a a magnetic read head with a single track pick up element on a front face thereof. These alignment slots thus indicate a first mounting position associated with aligning the single pick up element with Track 1 on a magnetic stripe card and a second mounting position similarly associated with Track 2.

This alignment arrangement is not relied up for any precision in locating the pick up elements on read head 30 with respect to data tracks on a data card. Precise registration is achieved by the cooperative registration arrangement previously described. For Track 1 and 2 alignment and registration, registration pins 62A,62B are received into registration apertures 58A,58B while registration pins 61A, 61B are received into slots 57A, 57B. The location of registration pins 62A,62B on mounting frame 32 together with the location of registration apertures 58A,58B positions mounting frame 32 are such that the read head and, more particularly, data pickup elements on a front face thereof are precisely aligned with Data Track 1 (single data pickup element) or Data Tracks 1 and 2 (two data pickup elements). By lining up tabs 66A,66B with the lower slots in alignment guides 53 and 54 and then snapping mounting frame 32 onto the resilient hooks 51, 52, the registration pins and apertures mate in an appropriate manner for the read head to be accurately positioned for the associated track reading.

Similarly, for Track 2 alignment and registration of a single track read head or Track 2 and 3 alignment and registration of a dual track read head, registration pins 61A,61B are received into registration apertures 56A,56B while registration pins 62A,62B are received into slots 57A,57B. The upper slots in alignment guides 53 and 54 are used generally to align mounting frame 32 relative to the card guide 31 for this reading condition and then the two pieces are snap mounted together.

It should be apparent that other forms of alignment arrangement could also be utilized. For example, a simple alignment marker line positioned on the side wall of card guide 31 could be utilized with the alignment tab to indicate where the two parts should be positioned for each of the two cases. Alternatively, an alignment mark on the outside end of each of the resilient hook arms 51,52 might be used cooperatively with two pairs of alignment marks on back surfaces of mounting frame 32 to provide this alignment function.

Mounting frame 32 carries read head 30 in a central mounting frame member 60 which has a central aperture 64 therein. Mounting frame 32 also has a pair of integral spring elements 67 and 68 formed thereon. These integral spring elements are preferably E-shaped springs having five interconnected resilient arm segments including a central arm segment 69,70 which is cantilevered from an edge of mounting frame 32 and has a free end with a tapered back surface that engages a back surface of read head 30. This leaf spring type of arrangement biases read head 30 toward the card guide slot with a spring pressure that maintains good contact between the magnetic pick up heads on a front surface and data tracks on a data card as it is manually swiped through the card slot. The combination of the characteristics of the engineering plastic used to form mounting frame 32 and the design of the E-shaped spring elements provide adequate spring force and reliable operation over the life of the unit which may involve many thousands of card swipe operations.

The simple method of assembly of this card reader unit should now be apparent. First, read head 30 is placed in central frame member 63 on back wall 60 of mounting frame 32. Then mounting frame 32 is snapped into place on card guide element 31 using the snap hook mounting arrangement and selecting one of the track alignment registrations as described above. After this subassembly has been put together, the card reader unit may be assembled into the housing of a terminal in the manner shown in FIGS. 2–5. Wires may then be connected to the terminals on the back of read head 30 to take the signals therefrom to appropriate signal processing circuits. Signal processing circuits may be of the type described in Chang et al. U.S. Pat. No. 4,788,420.

The above description of one embodiment of this invention is given as an example of the general structural and functional features of this invention. It should be understood that persons of skill in this art could make many modifications without departing from the scope of the invention. For example, it should be apparent that the snap hook mounting feature combined with the cooperative registration means using pins and apertures could be deployed independently of the integral biasing spring feature. The integral biasing spring feature would not be required for a data reading transducer that does not require contact with the data carrier. Any optical read head could simply be accurately positioned on the mounting frame so that it is set up for selectively reading a particular optical data track.

In addition, this invention is not limited to an arrangement in which two integral biasing springs are used. Instead an alternative version using a single integral biasing spring, such as is shown in one embodiment of copending and commonly assigned U.S. patent application Ser. No. 07/814,896, filed on the same date as this application, could also be used.

It should be understood that this card reader invention could be employed in a variety of terminal structures, including sophisticated point of sale checkout terminals for department and grocery stores.

Thus this invention is not limited to the embodiment disclosed includes all embodiments and variations within the scope of the following claims.

What is claimed is:

1. In apparatus having a reader assembly for reading a data carrier having data stored on at least one data track thereon, housing means defining a guide slot location for said data carrier;

transducer means for detecting said data stored on said data track;

guide means removably mounted to said housing means at said data carrier slot location, said guide means having at least a bottom wall portion defining a bottom guide surface of a guide slot for said data carrier and one major side wall portion defining one side guide surface of a guide slot for said data carrier and further defining an access window in said major side wall portion; and frame means for carrying said transducer means in a prearranged location thereon;

said guide means and said frame means including:

a cooperative registration means, including at least one pair of position registration elements formed on said first side wall member and a cooperatively engaging pair of position registration elements formed on said frame means for establishing an accurately registered mounting relationship therebetween and defining an accurate position location for said transducer means relative to said access window such that said data pickup element is accurately aligned with said data track; and at least a pair of resilient hook arms carried on said first side wall member and cooperating with a pair of hook engaging surfaces on said frame means to mount said frame means to said guide means.

2. Apparatus as claimed in claim 1, wherein said housing means includes at least one partial side wall portion at said guide slot location and defining a rectangular aperture having an open bottom, said guide means having at least one side wall defining a mounting wall portion substantially matching said rectangular aperture, each of the respective edge sections of said partial side wall portion adjacent said rectangular aperture and said mounting wall portion defining one of a cooperative tongue means and groove means such that said mounting wall portion of said guide means may be slidably inserted into said rectangular aperture with said cooperative tongue means and grove means removably mounting said guide means to said housing means;

said data track on said data carrier is positioned at a prearranged data track location corresponding to a one of at least first and second predefined data track locations on said data carrier, said cooperative registration means comprises first and second pairs of position registration elements formed on said first side wall member of said guide means such that said cooperatively engaging pair of position registration elements formed on said frame means may be selectably engaged with a prearranged one of said first and second pairs of position registration elements to position said frame means relative to said guide means in a prearranged one of first and second registered positions and thereby aligning said data pickup element of said transducer means with one of said first and second predefined data track locations;

said hook engaging surfaces on said frame means being formed to permit engagement with said pair of resilient hook arms in both said first and second registered positions.

3. Apparatus as claimed in claim 2, further comprising track alignment indicating means including a first alignment means formed on said first side wall member of said guide means and a second alignment means formed on said frame means, said first and second alignment means cooperatively assisting in aligning said guide means and said frame means for mounting said frame means in one of said first and second registered positions.

4. Apparatus as claimed in claim 3, wherein said first alignment means comprises first and second pairs of guide slots formed on said first side wall member of said guide means, and said second alignment means comprises a pair of alignment tabs formed on said frame means and adapted to be received into said guide slots.

5. Apparatus as claimed in claim 2, wherein said data carrier has a magnetic data track thereon, said data pickup element on said transducer means is a magnetic pick up head adapted to contact said magnetic data track for reading data on said track, said access window is an aperture formed in said first one of said side wall members to admit said magnetic pick up head into said guide slot, said frame means is formed from a plastic material and has integrally formed spring means carried thereon for engaging said transducer means and biasing said transducer means toward said guide slot to maintain contact pressure between said magnetic pick up head and said magnetic data track as said data carrier is passed through said guide slot.

6. Apparatus as claimed in claim 5, wherein said data carrier has three predefined data track positions associated therewith and comprising tracks 1, 2, and 3, and said data carrier has only a pair of adjacent magnetic data tracks formed thereon at a preselected one of track 1 and 2 pair or a track 2 and 3 pair, said magnetic pick up head has two magnetic pickup elements formed thereon at prearranged positions for simultaneously reading magnetic data on a pair of adjacent magnetic data tracks;

said cooperative registration means comprises first and second pairs of position registration elements formed on said first side wall member of said guide means such that said cooperatively engaging pair of position registration elements formed on said frame means may be selectably engaged with a prearranged one of said first and second pairs of position registration elements to position said frame means relative to said guide means in a prearranged one of first and second registered positions, said first registered position aligning said two magnetic pickup elements with said track 1 and 2 pair and said second registered position aligning said two magnetic pick up elements with said track 2 and 3 pair;

said hook engaging surfaces on said frame means being formed to permit engagement with said pair of resilient hook arms in both said first and second registered positions.

7. Apparatus as claimed in claim 6, further comprising track alignment indicating means including a first alignment means formed on said first side wall member of said guide means and a second alignment means formed on said frame means, said first and second alignment means cooperatively assisting in aligning said guide means and said frame means for mounting said frame means in one of said first and second registered positions.

8. Apparatus as claimed in claim 7, wherein said first alignment means comprises first and second pairs of guide slots formed on said first side wall member of said guide means, and said second alignment means comprises a pair of alignment tabs formed on said frame means and adapted to be received into one of said first and second pairs of guide slots, said first pair of guide slots being labeled to indicate its association with track 1 and 2 mounting registration and said second pair of guide slots being labeled to indicate its association with track 2 and 3 mounting registration.

9. Apparatus as claimed in claim 2, wherein
said data track on said data carrier is positioned at a prearranged data track location corresponding to a one of at least first and second predefined data track locations on said data carrier, and
said cooperative registration means comprises upper and lower pairs of registration pins formed on said frame means at the corners of a regular rectangle, and upper and lower pairs of registration apertures formed in said first side wall of said guide means at the corners of a regular rectangle together with first and second registration slots formed in said first side wall and each located between corresponding ones of said apertures in said upper pair and said lower pair, said upper and lower pairs of registration pins together with said registration apertures defining upper and lower registered mounting positions for said frame means relative to said guide means, said upper registered mounting position being active when said upper pair of registration pins is mounted in said upper pair of registration apertures with said lower pair of registration pins located in said registration slots, said lower registered mounting position being active when said lower pair of registration pins is mounted in said lower pair of registration apertures with said upper pair of registration pins located in said registration slots;
said hook engaging surfaces on said frame means being formed to permit engagement with said pair of resilient hook arms in both said upper and lower registered mounting positions.

10. Apparatus as claimed in claim 9, further comprising track alignment indicating means including a first alignment means formed on said first side wall member of said guide means and a second alignment means formed on said frame means, said first and second alignment means cooperatively assisting in aligning said guide means and said frame means for mounting said frame means in one of said first and second registered positions.

11. Apparatus as claimed in claim 10, wherein said first alignment means comprises first and second pars of guide slots formed on said first side wall member of said guide means, and said second alignment means comprises a pair of alignment tabs formed on said frame means and adapted to be received into said guide slots.

12. Apparatus as claimed in claim 9, wherein said data carrier has a magnetic data track thereon, said data pickup element on said transducer means is a magnetic pick up head adapted to contact said magnetic data track for reading data on said track, said access window is an aperture formed in said first one of said side wall members to admit said magnetic pick up head into said guide slot, said frame means is formed from a plastic material and has integrally formed spring means carried thereon for engaging said transducer means and biasing said transducer means toward said guide slot to maintain contact pressure between said magnetic pick up head and said magnetic data track as said data carrier is passed through said guide slot.

13. Apparatus as claimed in claim 12, wherein
said magnetic pick up head has a metal housing;
said frame means has a central frame member receiving said magnetic pick up head and holding said head in a prearranged position, said central frame member having tapered top and bottom walls which permit slight rotation of said magnetic head pick up unit around a central axis thereof to accommodate a warped card passing through said guide means;
said integrally formed spring means has a pair of contact regions formed thereon for contacting back edges of said metal housing to urge said housing toward said guide slot, each of said contact regions having a tapered contact surface to facilitate said slight rotation of said housing of said transducer means.

14. Apparatus as claimed in claim 13, wherein said integrally formed spring means comprises a single E-shaped spring element with a base member attached to said frame means and a central spring arm extending in cantilevered fashion behind said frame member and having a head member formed on a free end thereof with said pair of contact elements being formed on a back end of said head member for contact with a back region of said transducer means.

15. Apparatus as claimed in claim 13, wherein said integrally formed spring means comprises a pair of E-shaped spring elements each having a base member attached to opposing ends of said frame means and a central spring arm extending in cantilevered fashion behind said frame member and having a tapered contact element on a free end of said central spring arm for contact with a back region of said transducer means.

16. In a data terminal having a card reader assembly for reading a data card having a magnetic track formed thereon and defining at least one magnetically encoded data track at a prearranged location on said magnetic track,
a housing means defining a guide slot location for said data card and being formed by injection molding a plastic material having wear characteristics unsuitable to serving as a bottom wall of a card guide slot;

a read head having a magnetic transducer element carried on a front face thereof for detecting magnetically encoded data on said data track;

a card guide means removably mounted to said housing means at said guide slot location, said guide means being formed from a plastic material having substantially greater wear resistance than the plastic material forming said housing means and defining at least the bottom and one major side wall portion of a guide slot for said data card with an access window for said read head in said major side wall portion; and mounting means for mounting said read head to said card guide means at a prearranged registered location relative to said access window and with said front face thereof extending into said card guide slot, said mounting means including frame means for carrying said transducer in a prearranged location;

said card guide means and said frame means including:

a cooperative registration means, including at least one pair of position registration elements formed on said one major side wall portion and a cooperatively engaging pair of position registration elements formed on said frame means for establishing an accurately registered mounting relationship therebetween and defining an accurate position location for said transducer means relative to said access window such that said data pickup element is accurately aligned with said data track; and at least a pair of resilient hook arms carried on said one major side wall portion and cooperating with a pair of hook engaging surfaces on said frame means to mount said frame means to said guide means.

17. Apparatus as claimed in claim 16, wherein said housing means includes at least one partial side wall portion at said guide slot location and defining a rectangular aperture having an open bottom, said guide means has at least one side wall defining a mounting wall portion substantially matching the configuration of said rectangular aperture, each edge section of said partial side wall portion adjacent said rectangular aperture having an inwardly directed V-shaped groove formed therein, each edge section of said mounting wall portion of said guide means having an outwardly directed V-shaped tongue portion formed thereon and adapted to be received in said V-shaped groove such that said V-shaped tongue portions on said guide means may be slidably inserted into said V-shaped groves adjacent said rectangular aperture for removably mounting said guide means to said housing means;

said data track on said data carrier is positioned at a prearranged data track location corresponding to a one of at least first and second predefined data track locations on said data card;

said cooperative registration means comprises first and second pairs of position registration elements formed on said first side wall member of said guide means such that said cooperatively engaging pair of position registration elements formed on said frame means may be selectably engaged with a prearranged one of said first and second pairs of position registration elements to position said frame means relative to said guide means in a prearranged one of first and second registered positions and thereby aligning said data pickup element of said transducer means with one of said first and second predefined data track locations;

said hook engaging surfaces on said frame means being formed to permit engagement with said pair of resilient hook arms in both said first and second registered positions.

18. Apparatus as claimed in claim 16, wherein said frame means is formed from a plastic material and has integrally formed spring means carried thereon for engaging said read head and biasing said read head toward said guide slot to maintain contact pressure between said magnetic pick up head and said magnetic data track as said data carrier is passed through said guide slot.

* * * * *